H. JARVIS.
SELF CLOSING TAP.
APPLICATION FILED AUG. 31, 1917.

1,314,195.

Patented Aug. 26, 1919.

Inventor.
Harold Jarvis
by
HJS Dennison
Atty.

UNITED STATES PATENT OFFICE.

HAROLD JARVIS, OF TORONTO, ONTARIO, CANADA.

SELF-CLOSING TAP.

1,314,195.   Specification of Letters Patent.   Patented Aug. 26, 1919.

Application filed August 31, 1917. Serial No. 189,062.

*To all whom it may concern:*

Be it known that I, HAROLD JARVIS, a subject of the King of Great Britain, and resident of the city of Toronto, county of York, Province of Ontario, in the Dominion of Canada, have invented certain new and useful Improvements in Self-Closing Taps, described in the following specification and illustrated in the accompanying drawings, that form part of the same.

The principal object of the invention is to eliminate the undesirable noise and detrimental vibration commonly known as water hammer in a pressure actuated self closing tap.

The principal feature in the invention consists in the novel construction of the valve spindle and the arrangement of the closing valve whereby the passage through which the water flows is gradually cut off by the valve stem in the closing of the valve, the stem being formed with longitudinal grooves to allow of the passage of the water and a solid portion between said grooves and the closing valve.

In the drawings, Figure 1 is an elevational part sectional view of a tap constructed in accordance with this invention.

Figure 1:
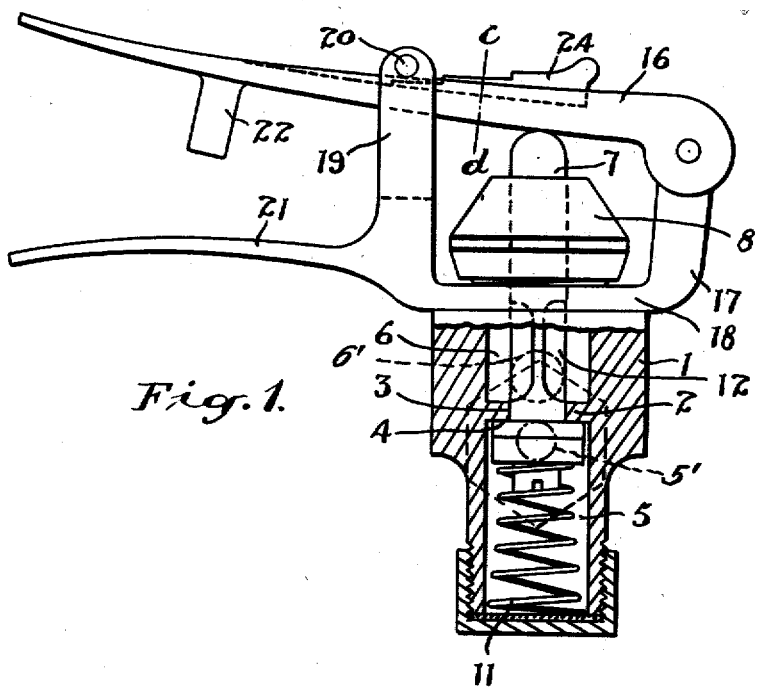
Figure 2:
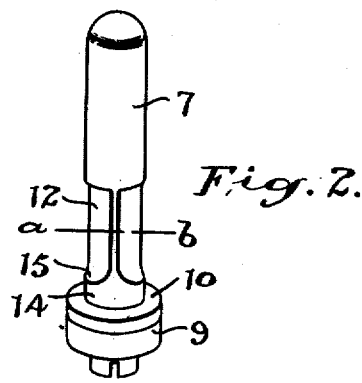
Fig. 2 is a perspective detail of the valve stem.
Figure 3:
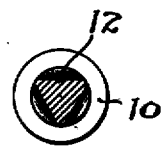
Fig. 3 is a cross sectional view through the line $a$—$b$ of Fig. 2.

Pressure closing valves of various forms have been known for a considerable period and it is the main object of this invention to overcome the difficulties met with in the use of such valves. This result has been achieved in the construction shown, in which the interior of the valve body 1 is formed with an annular shoulder 2 having the centrally arranged circular hole 3 and the valve seat 4 on the under face thereof.

The water enters the chamber 5 below the valve seat through the hole 5' indicated in dotted lines and flows upwardly through the hole 5" indicated in dotted lines to the hole 3 and out through a suitable nozzle or faucet (not shown) connected with the chamber 6, the opening through the nozzle being indicated by 6'.

The cylindrical valve stem 7 is slidably arranged in the hole 3 and the upper end extends through the packing nut 8 at the top of the valve. The lower end of the valve stem is formed with an enlarged cylindrical portion 9, upon the upper surface of which and surrounding the stem is arranged a washer 10, which washer is adapted to abut the valve seat 4 and effectively close the passage, the pressure holding it closed. A coil spring 11 is arranged within the chamber 5 to insure the closing of the valve.

The valve stem 7 is grooved as shown preferably at three sides to form a triangular shaped section 12, the lower ends 15 of the grooves being preferably beveled and spaced a substantial distance above the washer 10, so that in closing, the full circular portion 14 will enter the hole 3 and cut off the supply before the full pressure of the water is exerted against the bottom end of the spindle to hold it closed. This arrangement for cutting off the flow eliminates the hammering effect which takes place in the present forms of self closing taps. The valve stem 7 is operated to open the valve by means of the lever 16 engaging the top thereof, said lever being pivotally secured to the lug projection 17 of the cap member 18 secured to the upper part of the valve body 1.

The member 18 is preferably provided with an upwardly projecting lug 19 which is slotted vertically to receive the lever 16 and a pin 20 extends across the top of the slot to secure the lever from being turned over. A fixed arm 21 forms part of the member 18 and the lever 16 is provided with a lug 22 adapted to engage the arm member 21, to prevent the lever being sprung.

Figure 4:
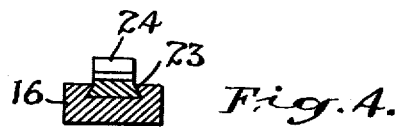
Fig. 4 is a cross sectional view through the line $c$—$d$ of Fig. 1.

The upper face of the lever 16 is formed with a longitudinal slot 23, which is preferably undercut as shown in Fig. 4 and in this slot is arranged a sliding block 24 which block is formed with a plurality of steps. These steps are adapted to engage the pin 20 so as to hold the tap open if it is desired to have the water running for any special purpose. This block arrangement may be dispensed with if desired, without in any way interfering with the operation of the tap.

In the operation of this tap, upon the squeezing of the lever 16 and arm 21 together the lever 16 presses downwardly upon the valve stem 7 and removes the valve washer 10 from its seat. The stem fits the hole 3 loosely and water at once commences to flow, though very slightly, through the hole. The further downward movement brings the beveled ends 15 of the grooves into communication with the pressure chamber 5 and the water then flows freely through the hole 3 around the stem. This flow continues as long as the lever 16 is held down, but immediately upon its release the pressure of the spring 11 and the pressure of the water against the underside of the valve, moves the valve spindle upwardly. Ordinarily when this action occurs the pressure of the water closes the valve with a snap and a hammer results but by arranging the grooves in the spindle in the manner described the flow is gradually cut off and the action of the spindle is thus retarded.

A tap constructed as described has been very satisfactorily tested under various pressures and it is found to be absolutely free from noise.

What I claim as my invention is:—

1. A self closing tap comprising a valve body having a central chamber open at the top and provided with a valve seat arranged between inflow and outflow openings, a valve stem arranged in said chamber and extending thereabove and having a valve at its lower end for closing against the valve seat, a cap closing the top of said chamber and encircling said valve stem and having a rigid arm extending therefrom, a packing nut secured to said cap and encircling said stem, a lever pivotally supported from said cap and extending over and engaging the top of the valve stem and arranged above said arm, and means for guiding and supporting said lever intermediate of its length.

2. In a self-closing valve, a body portion open at the top and having a valve seat, a grooved valve stem extending through said valve seat and having a valve at the inner end adapted to be pressure closed against said seat, a cap secured to the top of said body portion, an arm extending upwardly from said cap, a lever pivotally secured to the upper end of said arm and adapted to engage the upper end of said valve stem, a slotted lug projecting upwardly from said cap on the side opposite to the lever supporting arm, said lug forming a guide for limiting the movement of said lever, and a rigid arm projecting from said cap and arranged below said lever.

3. In a self-closing valve, a pressure closed valve, a lever pivotally supported from the valve body for opening the valve, a slotted arm extending each side of said lever and having a cross bar at the top, and a member slidably arranged on said lever adapted to engage the underside of said cross bar for holding the valve open.

HAROLD JARVIS.